United States Patent [19]

Hill et al.

[11] Patent Number: 5,674,942
[45] Date of Patent: Oct. 7, 1997

[54] INTERPENETRATING POLYMER NETWORKS FOR CONTACT LENS PRODUCTION

[75] Inventors: Gregory A. Hill, Ponte Vedra Beach, Fla.; Kurt C. Frisch, Grosse Ile, Mich.; Vahid Sendijarevic, Troy, Mich.; Shaio-Wen Wong, St. Clair Shores, Mich.

[73] Assignee: Johnson & Johnson Vision Products, Inc., Jacksonville, Fla.

[21] Appl. No.: 415,001

[22] Filed: Mar. 31, 1995

[51] Int. Cl.⁶ .................... C08L 75/02; G02C 7/04
[52] U.S. Cl. ............. 525/131; 351/160 R; 351/160 H; 525/123; 525/128; 525/903
[58] Field of Search ............. 351/160 H, 160 R; 525/123, 128, 131, 903

[56] References Cited

U.S. PATENT DOCUMENTS

| | | | |
|---|---|---|---|
| 3,503,942 | 3/1970 | Seiderman | 526/320 |
| 4,254,065 | 3/1981 | Ratkowski | 264/2.5 |
| 4,302,553 | 11/1981 | Frisch et al. | 525/128 |
| 4,359,558 | 11/1982 | Gould et al. | 525/455 |
| 4,408,023 | 10/1983 | Gould et al. | 525/454 |
| 4,430,458 | 2/1984 | Tighe et al. | 523/108 |
| 4,454,309 | 6/1984 | Gould et al. | 525/454 |
| 4,496,535 | 1/1985 | Gould et al. | 424/19 |
| 4,536,554 | 8/1985 | Lim et al. | 526/264 |
| 4,644,033 | 2/1987 | Gnanou et al. | 524/590 |
| 4,780,488 | 10/1988 | Su et al. | 523/106 |
| 4,786,657 | 11/1988 | Hammar et al. | 522/90 |
| 4,857,606 | 8/1989 | Su et al. | 525/455 |
| 4,859,780 | 8/1989 | Molock et al. | 548/550 |
| 4,923,666 | 5/1990 | Yamazaki et al. | 264/572 |
| 4,931,521 | 6/1990 | Matsuda et al. | 526/286 |
| 4,983,702 | 1/1991 | Mueller et al. | 528/28 |
| 5,039,769 | 8/1991 | Molock et al. | 526/301 |
| 5,087,392 | 2/1992 | Burke et al. | 264/2.7 |
| 5,170,192 | 12/1992 | Pettigrew et al. | 351/161 |
| 5,331,051 | 7/1994 | Ishibashi et al. | 525/131 |
| 5,356,946 | 10/1994 | Mafoti et al. | 521/163 |

FOREIGN PATENT DOCUMENTS 0 330 615   8/1989   European Pat. Off. .

OTHER PUBLICATIONS

H.X. Xiao, *Journal of Polymer Science*, vol. 21, P2547–2557 (1983).
Lee et al., *Macromolecules*, vol. 17, p268–272 (1984).
L.T. Manzione, *Encyclopedia of Polymer Science and Engineering*, vol. 14 (1985).
Klemperer et al., *Encyclopedia of Polymer Science and Engineering*, vol. 8 (1985).

*Primary Examiner*—Rabon Sergent

[57] ABSTRACT

The present invention is directed to an interpenetrating polymer network comprised of a polyurea network interpenetrated with a polyacrylic network and the article of manufacture, such as a contact lens, made therefrom.

30 Claims, No Drawings

INTERPENETRATING POLYMER NETWORKS FOR CONTACT LENS PRODUCTION

BACKGROUND OF THE INVENTION

1. Field of the Invention

The present invention relates to interpenetrating polymeric network (IPN) compositions, and the use thereof in contact lenses. More particularly, the present invention relates to an IPN comprised of a polyurea network and polyacrylic network; the former network is prepared from amines and isocyanates while the latter network is prepared from acrylic esters polymerized with a free radical initiator. The polyurea/polyacrylic network may be cross-linked with triamines.

The IPN is used to prepare a lens. The resulting finished contact or intraocular lens produced from the IPNs of the present invention has the clarity, dimensional stability, oxygen permeability, wettability, and durability desired for either daily or extended wear contact lenses or intraocular lenses.

2. Discussion of the Prior Art

The use of contact lenses as corrective ophthalmic devices as well as for cosmetic purposes is well known. Various materials have been utilized in making contact lenses, but these materials have been found less than ideal.

To be effective as a material for a contact lens, the material must possess certain key properties:

(a) a high oxygen permeability, (b) good wettability, (c) durability, (d) good mechanical strength, (e) optical clarity, (f) flexibility, (g) ability to transmit light in the visible range, and (h) homogeneity and (i) control known changes in the lens parameters in the ocular environment.

Various materials possess one or more of these properties but lack one or more of the other required properties. For example, contact lenses derived from hydrophobic polymers possess good mechanical strength and durability. Such hydrophobic polymers used in the prior art to make contact lens include urethanes, polyesters, polyamides, siloxanes, epoxides and the like. However, such contact lenses lack wettability and oxygen permeability.

On the other hand, hydrophilic material permits wettability and oxygen permeability. Examples of hydrophilic monomers used in the prior art include hydroxyalkyl methacrylate, vinyl alcohol and vinyl pyrrolidone. But, these materials lack such properties as good mechanical strength and durability.

Thus, the ideal contact lens material is one that is a composite of a hydrophilic and hydrophobic material that maximizes the advantages of both materials and minimizes their weaknesses.

The standard contact lens used almost exclusively for many years was made from poly(methylmethacrylate) (PMMA). PMMA can be readily injection molded, compression molded, or cast molded to give inexpensive, highly transparent, stable, hard, wettable contact lenses. However, as a result of the very low oxygen permeability of PMMA, lenses made therefrom have to be removed from the eye at least once daily.

In order to overcome the deficiency of the PMMA lenses, numerous other organic polymers have been proposed for use as contact lenses. Cellulose acetate butyrate lenses, for example, have a somewhat higher oxygen permeability than PMMA and are readily fabricated by injection molding but have a lower dimensional stability than PMMA.

Soft contact lenses based upon crosslinked polymers from hydrophilic monomers, such as 2-hydroxyethyl methacrylate or N-vinyl-2-pyrrolidone, are found to be generally more comfortable to wear than PMMA lenses but are more fragile and have a tendency to become cloudy because of the ease by which proteinaceous material and other contaminants are deposited thereon. Soft lenses prepared from silicone rubber have a very high oxygen permeability but poor mechanical properties are resistant to wetting and adhere to the cornea.

Improvements in contact lens materials have been approached by utilizing copolymers. For example, U.S. Pat. No. 3,503,942 to Seiderman describes a contact lens comprised of a mixture of hydrophilic monomers. The use of various combinations of monomers to produce copolymers is limited by the ability of these monomers to copolymerize. If monomers which do not copolymerize well are chosen (e.g., methyl methacrylate and vinyl pyrrolidinone), soluble polymer fragments are formed. These soluble fragments must be extracted from the lens.

Lenses prepared from copolymers of a silicone methacrylate with methyl methacrylate (Gaylord, U.S. Pat. No. 4,120,570) or with methyl itaconate (Ellis, U.S. Pat. No. 4,424,328) have greater but still limited oxygen permeability.

Wichterle in U.S. Pat. No. 3,408,429 describes a complex centrifugal casting technique for converting a mixture of hydroxyethyl methacrylate and ethylene glycol dimethacrylate into a cross-linked polymer lens which, upon being subjected to normal saline, is converted into a soft contact lens. This complex procedure inherently yields products having optics that are inferior to those of hard contact lenses.

Considerable attention has been given to the modification of polymer properties through the use of procedures involving the formation of an interpenetrating polymer network (IPN). An IPN can be defined broadly as an intimate network of two or more polymers at least one of which is either synthesized and/or cross-linked in the presence of the other.

Liu, for example, in U.S. Pat. No. 4,618,644, describes the polymerization of methyl methacrylate in the presence of a silicone polymer to obtain a product of improved toughness. The polymerization of ethylene glycol dimethacrylate and a crosslinkable poly- (dimethylsiloxane) to yield a product stated to be useful for the fabrication of contact lenses is described by Falcetta (Ger. Offen. DE 2,518,904). Contact lenses have also been fabricated from the interpenetrating network polymer resulting from the polymerization of 2-hydroxyethyl methacrylate in the presence of poly-N-vinylpyrrolidone (Ewell, U.S. Pat. No. 3,647,736).

Neefe (U.S. Pat. No. 4,632,773) shows the polymerization of methyl methacrylate in the presence of a syrup containing polymerized methacryloxypropyl-trimethoxysilane and a fluorescent colored pigment to obtain a solid contact lens blank material which can be readily identified. Tighe and Gee (U.S. Pat. No. 4,430,458) disclose the formation of soft contact lens material by the cross-linking of a polymeric hydrogel of a copolymer of N-vinyl-2-pyrrolidone during the final compression or injection molding process. Lim, et al. (U.S. Pat. No. 4,536,554) describes the preparation of soft contact lenses made form the interpenetrating network polymer obtained by the polymerization of a mixture containing a hydrophilic and a hydrophobic monomer and at least two cross-linking agents.

However, until the present invention, no one had recognized that an IPN comprising a network of polyurea interpenetrated with polyacrylate would be the material of choice for contact lenses. This IPN combines a weak hydrophilic polymer with a hydrophobic polymer.

Moreover, the present inventors have discovered that both the ratio of polyurea to acrylate and the polyamine composition are critical for this material to be used in a contact lens; however, if the ratio is within certain specified limits and the polyamine is of certain composition, the resulting IPN material possesses all of the key properties described hereinabove and is most suitable for making contact lenses.

SUMMARY OF THE INVENTION

Accordingly, the present invention is directed to a homogeneous interpenetrating polymer network exhibiting a single glass transition temperature prepared from polymerization of a reactive mixture of polymerizable components, said reactive mixture comprising (a) an amine mixture comprising polyamines A and B, where A is different from B, said amines being present in about 20–60% by weight of said reactive mixture, wherein A is

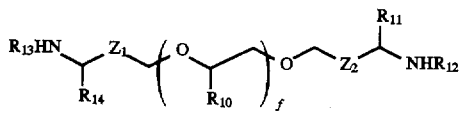

and B is $H_2N-R-(-OR)_{f1}-NH_2$ wherein $f_1$ is an integer from 1–75;

R is an alkylene containing 3 carbon atoms f is an integer between 1 and 150, inclusive; $R_{10}$, $R_{11}$, $R_{12}$, $R_{13}$ and $R_{14}$ are independently hydrogen or lower alkyl;

$Z_1$ and $Z_2$ are independently a chemical bond or lower alkylene with A and B being present in relative weight percentages ranging from about 60 to about 100% A, (b) an organic di- or poly-isocyanate present in sufficient quantity to react with the amine mixture of (a), forming therefrom a polyurea network;

(c) an acrylic ester of the formula

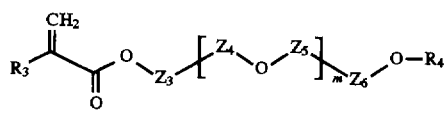

or

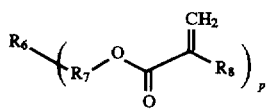

wherein $R_3$ is hydrogen or lower alkyl;

m is an integer from 0 to 150;

$Z_3$ and $Z_5$ are independently lower alkylene;

$Z_4$ and $Z_6$ are independently a chemical bond or lower alkylene;

$R_4$ is hydrogen, lower alkyl or

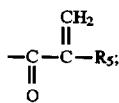

$R_5$ is hydrogen or lower alkyl;

$R_6$ and $R_8$ are independently lower alkyl;

p is an integer of 1 to 3;

and $R_7$ is lower alkylene or a chemical bond or $CH_2(OCH_2CH_2)_q$;

q is an integer between 0 and 200, inclusive, said acrylic ester being present in about 10–50% by weight in said reactive mixture; and (d) a free radical initiator being present in sufficient quantity in said reactive mixture to polymerize the acrylic ester of (c), forming therefrom a polyacrylic network, wherein the ratio of polyurea to polyacrylic ranges from about 90:10 to about 50:50, and (e) a triamine present in sufficient quantities to crosslink said amine mixture of (a).

DETAILED DESCRIPTION OF THE INVENTION

As used herein, the term "lower alkyl", when used alone or in combination with other groups, refers to an alkyl chain containing 1–6 carbon atoms. The alkyl groups may be straight chained or branched. Examples include methyl, ethyl, propyl, isopropyl, butyl, sec-butyl, t-butyl, isobutyl, pentyl, isopentyl, neopentyl, hexyl, and the like. It is preferred that the alkyl group contains 1–3 carbon atoms.

As used herein, the term "alkylene" refers to a hydrocarbyl group derived from an alkyl group by dropping a hydrogen from the formula. The alkylene is bonded to two other groups in the main chain. Examples include —$CH_2$—, —$CH_2$—$CH_2$—, —$CH_2$—$CH_2$—$CH_2$—,

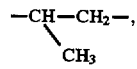

and the like. It is preferred that the alkylene groups contain 1–3 carbon atoms.

The present invention is directed to interpenetrating network polymers suitable as materials in the manufacture of contact lens and particularly to such polymers that have been prepared with modifiers and cross-linking agents and the optical contact lens prepared from such materials.

More specifically, the present invention is directed to a polyurea network interpenetrated with a polyacrylic network in such a manner as to form an interpenetrating network which is completely homogeneous and exhibits a single glass transition temperature.

The polyurea network described hereinabove is a network comprised of amines, i.e., amine terminated chain extender, with organic di- or polyisocyanates. In addition, an amine cross-linking agent is required, which is described hereinbelow.

The amines suitable for the present invention are polymers having two or more terminal amino functionalities. The most preferred amines are amino terminated polyethers. Examples of the most preferred polyamines include poly (oxyethylene) diamine, poly (oxypropylene) diamine, triethylene glycol diamine, and the like.

In a preferred embodiment, the amine component is comprised of a mixture of diamines, i.e., a polyoxyethylene diamine and a polyoxypropylene diamine. It has been found by the present inventors that the balance between polyoxyethylene diamine and polyoxypropylene diamine is very important to the transparency and water absorption properties of the IPN elastomers. The presence of poly (oxyethylene) diamines in the formulation is necessary to permit the hydrogel to absorb water. As the content and molecular weight of the polyoxyethylene diamine increases, the resulting hydrogels absorb more water. Unfortunately, the transparency suffers as the poly (oxyethylene) diamines tend to crystallize. The presence of poly (oxypropylene) diamines in the formulation is necessary to obtain transparent hydrogels.

The poly (oxyethylene) diamine used in the present invention has the formula

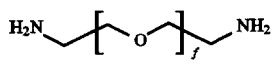

wherein f is an integer from 2–150.

The poly (oxypropylene) diamine used herein is preferably of the formula $$H_2N-R-(O-R)_{f1}-NH_2$$

wherein R is an alkylene chain containing 3 carbon atoms, and $f_1$ is an integer of 1–75.

It is preferred that $f_1$ is 30 and f is 30–70.

In the preferred embodiment of the present invention, a mixture of amines preferably comprises poly (oxyethylene) diamine having the formula

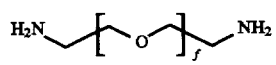

wherein f is an integer of 30–70 and a poly (oxypropylene) diamine of formula IB

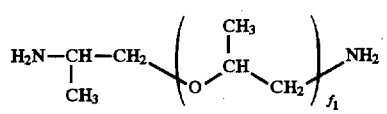

wherein $f_1$ is an integer of 1–50.

It is preferred that the amine be present in about 20–60% by weight in the starting monomeric mixture. The preferred relative weight of IA and IB ranges from about 60 to about 100% A.

It is to be noted that unless indicated to the contrary, the percentages and ratios are by weight.

The diamines utilized in the present invention are either commercially available or are prepared by conventional techniques known to one skilled in the art. The following examples are illustrative to show the techniques readily utilized by the skilled artisan to make the diamines used herein.

Exemplary procedures are shown below. In the first exemplification, the two terminal hydroxy groups in the glycol are functionalized into facile leaving groups, e.g., bromide, using phosphorus tribromide in ether.

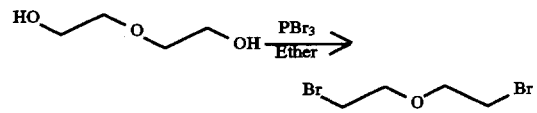

The dibromide can be converted into the diamine using the Gabriel Phthalimide synthesis, wherein potassium phthalimide is used to displace the bromide.

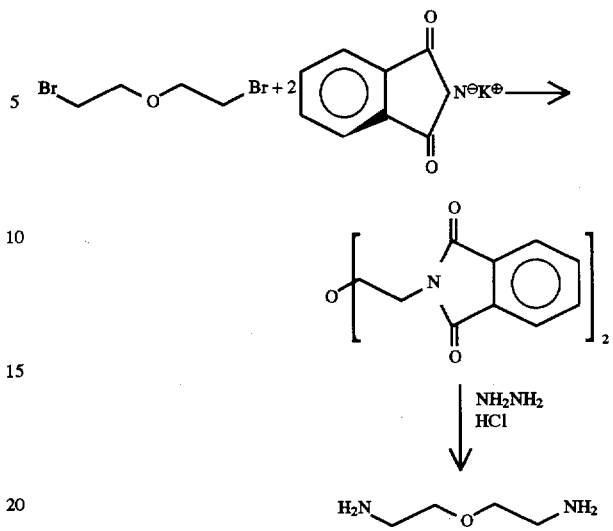

Workup typically involves cleavage using hydrazine and protonation to liberate the free diamine.

Another exemplary procedure for the synthesis of the diamine involves the displacement of the bromide using azide anion as the nucleophile. Subsequent reduction using lithium aluminum hydride yields the diamine.

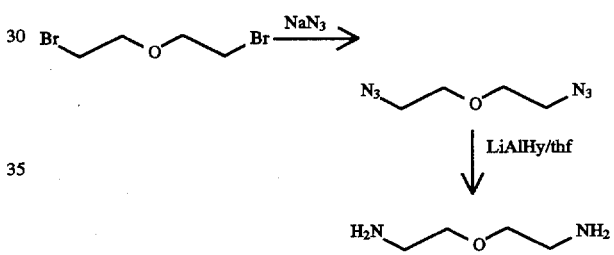

Yet another method of synthesizing the diamine uses hexamethylene tetraamine in ethanol to give a di-ammonium salt of the dibromide. Subsequent hydrolysis of the salt yields the diamine.

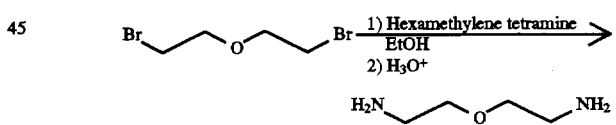

Other leaving groups that can be used in place of the bromide are the other halides such as chloride, and iodide, tosylate, brosylate, triflates, benzoate and other anions whose $pK_a$ value is low enough for displacement by nitrogen nucleophiles such as those described hereinabove.

The organic di- or polyisocyanates used to form the polyurea network of the present invention is represented by the formula Q(NCO)$_t$ wherein t is preferably 1–4 and Q is an hydrocarbyl group, i.e., an organic radical consisting solely of carbon atoms and hydrogen atoms. Q may be aliphatic, alicyclic, aromatic, or combination of any of these groups, such as aliphatic-aromatic group, aliphatic-alicyclic group, and the like. The Q group may be unsubstituted or substituted with lower alkyl, hydroxy or lower alkoxy. It is preferred that the isocyanate is aliphatic. In a preferred embodiment, it is preferred that Q contains from 3–26 carbon and more preferably from 4–20 carbon atoms and most preferably from 6–14 carbon atoms. In the above formula, t is an integer greater than 1 and preferably 2–4. These isocyanates are readily prepared using art recognized techniques or are commercially available. Representative examples of the above isocyanates include tetramethylene diisocyanate; hexamethylene diisocyanate; trimethylhexamethylene diisocyanate; dimer acid diisocyanate; isophorone diisocyanate; dimethylbenzene diisocyanate; diethylbenzene diisocyanate; decamethylene 1,10-diisocyanate; cyclohexylene 1,2-diisocyanate; cyclohexylene 1,4-diisocyanate; 2, 4-and 2-6-tolylene diisocyanates; 4,4-diphenylmethane diisocyanate; 1,5-naphthalene diisocyanate; dianisidine diisocyanate; toluidine diisocyanate; 4,4-methylene bis (cyclohexyl-isocyanate); neopentyl tetraisocyanate; m-xylylene diisocyanate; tetrahydronaphthalene -1,5- diisocyanate and bis-(4-isocyanatophenyl) methane, and the like.

The most preferred isocyanate is 4,4'-methylene bis (cyclohexylisocyanate). Other preferred isocyanates are trimethyl hexamethylene diisocyanate and isophorone diisocyanate.

The isocyanates utilized in the present invention react with the amines to form the polyurea network. The isocyanates are present in such amounts as to react with the amines present. In essence, the amount of isocyanate is chosen to substantially equal the number of equivalents of amine. In the preferred embodiment, the isocyanate is present in 15–50% by weight of the starting monomeric mixture, and preferably in the amount of 25–40% by weight.

The reaction of the isocyanate with the amines is spontaneous, and thus no catalyst is needed for the polyurea formation. Moreover, the reaction is exothermic. The heat generated from the amine-isocyanate reaction can accelerate the free radical initiated polymerization of the acrylate, the other network of the interpenetrating network polymer.

The other network is made from acrylic esters. The acrylic esters suitable for the present invention are polymerizable polyacrylate derivatives of polyhydric alcohols.

The acrylic esters are the ester derivatives of acrylic acid of the following formula:

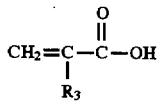

wherein $R_3$ is hydrogen or lower alkyl. It is to be noted that when $R_3$ is methyl, the acid is methacrylic acid.

Monohydric alcohols and polyhydric alcohols having a molecular weight of less than 7,000 daltons are suitable for esterification to the acrylic acids described hereinabove for use in the present invention. Preferred alcohols include monomethoxypolyethylene glycol and ethoxyethylene glycol, ethylene glycol, diethylene glycol, triethylene glycol, poly (oxyethylene) glycol, poly (oxypropylene) glycol, poly (oxypropylene) triol, glycerol, trimethylol ethane, trimethylol propane, 1,4-cyclohexane diol, pentaerythritol, and the like.

Since the polyhydric alcohols contain more than one hydroxy group, when utilized, more than one acrylate unit can esterify to the polyhydric alcohols. Thus, acrylic esters of the present invention include mono-, di-, and poly acrylate derivatives of the alcohols described hereinabove, especially methacrylate derivatives thereof.

The acrylic esters useful in the present invention have the formulae:

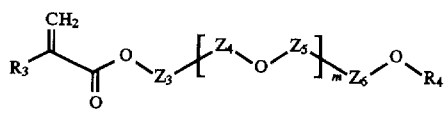

or

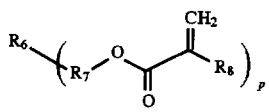

wherein $R_3$ is as defined hereinabove;

m is an integer from 0 to 150; and $Z_3$ and $Z_5$ are independently lower alkylene;

$Z_4$ and $Z_6$ are independently a chemical bond or lower alkylene;

$R_4$ is hydrogen, lower alkyl or

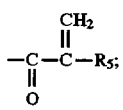

$R_5$ is hydrogen or lower alkyl;

$R_6$ and $R_8$ are lower alkyl;

p is an integer of 1 to 3; and $R_7$ is a lower alkylene, a chemical bond or $CH_2(OCH_2CH_2)_q$, and q is an integer of 0 to 200 inclusive.

It is most preferred that $R_3$, $R_5$ and $R_8$ are alkyl having 1–3 carbon atoms, especially methyl.

Preferred values of $R_6$ and $R_8$ are lower alkyl having 1–3 carbon atoms. Preferred $R_6$ is ethyl and preferred $R_8$ is methyl. It is preferred that $R_7$ is methylene. Preferred values of $R_4$ are hydrogen, lower alkyl having 1–3 carbon atoms and

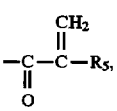

especially methacrylate.

It is preferred that m is 0 to 30, and more especially 0 to 20.

Preferred values of $Z_4$ and $Z_5$ are independently chemical bonds or alkylene group having 1–3 carbon atoms, while preferred values of $Z_3$ and $Z_5$ are alkylene having 1–3 carbon atoms. It is also preferred that $Z_3$ is the same as $Z_6$ and that $Z_4$ is the same as $Z_5$.

A preferred embodiment of Formula III is

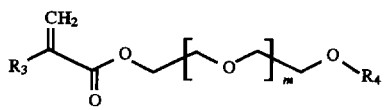

wherein m, $R_3$ and $R_4$ are as defined hereinabove. It is preferred that $R_4$ is hydrogen or lower alkyl, $R_3$ is lower alkyl, especially methyl, and m is 0–50, more preferably 0–30 and most preferably 0–20.

Another preferred acrylic monomer of Formula III is the diacrylate of the formula:

$$\text{CH}_2=\overset{\displaystyle\text{CH}_2}{\underset{\displaystyle\text{R}_9}{\text{C}}}-\overset{\text{O}}{\underset{\text{O}}{\text{C}}}-\text{O}-[\text{CH}_2\text{CH}_2-\text{O}]_n-\text{CH}_2\text{CH}_2-\text{O}-\overset{\text{O}}{\underset{\text{O}}{\text{C}}}-\overset{\text{CH}_2}{\underset{\text{R}_5}{\text{C}}}\qquad\text{IIIB}$$

wherein $R_5$ is as defined hereinabove, preferably methyl, $R_9$ is hydrogen or lower alkyl and n is 0 to 50, more preferably 0 to 30, and most preferably 0–20.

The acrylic esters are present in about 10–50% by weight in the starting monomer mixture, and more preferably from about 15 to about 35% by weight.

It is preferred that the acrylic ester component consists of a mixture of monomer acrylates. The first acrylic monomer is comprised of the acrylate of Formula IIIA, while the second acrylic monomer comprises the compound of IIIB, IV, or mixture thereof. The first and second acrylic monomers are present in relative weight ratios ranging from about 80/20 to about 95/5, respectively.

The most preferred acrylic esters are mono-, di-, and tri-methacrylates of the alcohols described hereinabove. Examples of the acrylate monomers of the present invention include monomethacrylates, such as hydroxyethylmethacrylate (HEMA) of the formula $$\text{H}_2\text{C}=\overset{\text{CH}_2}{\text{C}}-\overset{\text{O}}{\underset{\text{O}}{\text{C}}}-\text{O}-\text{CH}_2\text{CH}_2-\text{OH}$$

Another preferred monomethacrylate is poly-(ethylene glycol) monomethacrylate having the formula $$\text{H}_3\text{C}-\overset{\text{CH}_2}{\text{C}}-\overset{\text{O}}{\underset{\text{O}}{\text{C}}}-\text{O}-\text{CH}_2\text{CH}_2-[\text{O-CH}_2\text{CH}_2]_m-\text{OH}$$

wherein m is an integer from 0 to 20.

Another preferred monomethacrylate is poly (propylene glycol) monomethacrylate having the formula $$\text{H}_3\text{C}-\overset{\text{CH}_2}{\text{C}}-\overset{\text{O}}{\underset{\text{O}}{\text{C}}}-\text{O}-\underset{\text{CH}_3}{\text{CH}}-\text{CH}_2-[\text{O-CH(CH}_3)\text{CH}_2]_m-\text{OH}$$

wherein m is an integer from 0 to 20.

A preferred dimethacrylate is poly (ethylene glycol) dimethacrylate, having the formula $$\text{H}_3\text{C}-\overset{\text{CH}_2}{\text{C}}-\overset{\text{O}}{\underset{\text{O}}{\text{C}}}-\text{O}-\text{CH}_2\text{CH}_2-[\text{O-CH}_2\text{CH}_2]_n-\text{O}-\overset{\text{O}}{\underset{\text{O}}{\text{C}}}-\overset{\text{CH}_3}{\underset{\text{CH}_3}{\text{C}}}$$

wherein n is an integer from 0 to 20.

Another preferred dimethacrylate is poly (propylene glycol) dimethacrylate having the formula $$\text{H}_3\text{C}-\overset{\text{CH}_2}{\text{C}}-\overset{\text{O}}{\underset{\text{O}}{\text{C}}}-\text{O}-\underset{\text{CH}_3}{\text{CH}}-\text{CH}_2-[\text{O-CH(CH}_3)\text{CH}_2]_n-\text{O}-\overset{\text{O}}{\underset{\text{O}}{\text{C}}}-\overset{\text{CH}_2}{\underset{\text{CH}_3}{\text{C}}}$$

wherein n is integer from 0 to 20.

A preferred trimethacrylate is trimethylol propane trimethacrylate having the formula $$\left(\text{CH}_3-\text{CH}_2-\overset{|}{\underset{|}{\text{C}}}-\text{CH}_2-\text{O}-\overset{\text{O}}{\underset{\text{O}}{\text{C}}}-\overset{\text{CH}_2}{\underset{\text{CH}_3}{\text{C}}}\right)_3$$

The acrylic esters used in the present invention are prepared by art recognized techniques of esterification known to one skilled in the art. The following descriptions are exemplary.

The acrylic esters can be synthesized by the condensation of alcohol with an acrylic acid derivative in the presence of a suitable weak base such as triethylamine. This is illustrated below in the synthesis of a diacrylate from a diethylene glycol.

$$\text{HO}-\text{CH}_2\text{CH}_2-\text{O}-\text{CH}_2\text{CH}_2-\text{OH} + 2\,\text{H}_2\text{C}=\overset{|}{\underset{\text{O}}{\text{C}}}-\text{X}\quad\xrightarrow{\text{NEt}_3}_{\text{CH}_2\text{Cl}_2}$$

$$\left[\text{O}-\text{CH}_2\text{CH}_2-\text{O}-\overset{\text{O}}{\underset{\text{O}}{\text{C}}}-\overset{|}{\text{C}}=\text{CH}_2\right]_2$$

In the above synthesis, X is a good leaving group such as Cl, Br, $NH_2$, OH, lower alkylamino or diloweralkylamino.

The corresponding monoacrylate can be synthesized using a stoichiometric amount of the acrylic acid derivative. The reaction can be conducted in polar aprotic solvents like dichloromethane and chloroform.

The use of alkyl substituted acrylic acid derivatives for the above condensation is equally feasible. The most preferred acrylic acid derivatives for the above condensation are methacrylate derivatives having the formula $$\overset{\text{CH}_2}{\underset{\text{H}_3\text{C}}{\text{C}}}=\overset{\text{X}}{\underset{\text{O}}{\text{C}}}$$

wherein X is a good leaving group, e.g., halide, such as Cl or Br, OH, lower alkylamino or diloweralkylamino.

Another procedure is the reaction of the methacrylic acid and the alcohol in the presence of acid such as hydrochloric acid or p-toluene-sulfonic acid under Fischer esterification conditions.

To form the acrylate network, the acrylates described hereinabove are reacted with a free radical initiator under polymerization conditions. Free radical polymerization initiators of the type commonly used in polymerizing ethylenic compounds are suitable for use in the present invention. They include such representative initiators as benzoyl peroxide; t-butyl hydroperoxide; t-butyl peroxide; azo-bis (isobutyronitrile); 2,5-dimethyl-2,5-di (2-ethyl hexanoylperoxy) hexane; 1,1-di (t-butylperoxy)-3,3,5-trimethylcyclohexane; di-t-butyl-diperoxyphthalate; organic peroxides; hydroperoxides; mixtures of peroxide and hydroperoxide (Lupersol DDM-9); 1,1'-azobis-(1-cyclohexanecarbonitrile); 2,2'-azobis [2- (2-imidazolin-2-yl) propane] dihydrochloride; 2,2'-azobis (2,4-dimethylvaleronitrile); 2,2'-azobis (4-methoxy-2,4-dimethylvaleronitrile); and the like.

The free radical initiators are present in amounts ranging from amounts greater than 0% to about 2% by weight of the reaction mixture, and preferably from 0.01% to about 1%, and more preferably from 0.02% to about 0.5%, and most preferably from 0.03% to about 0.1% of the mixture.

In addition, a triamine is additionally present in the monomeric mix. The triamines are useful as crosslinker agents in the polyurea-acrylic IPNs. They also are used as compatibilizers in the polyamine mixture, especially when the reaction is conducted in the absence of a mixing device. In order to ensure homogeneity between the polyoxyethylene diamine and the polyoxypropylene diamine, the amine mixture is preferably constantly stirred. The triamines are present in amounts ranging from about 30% to about 50% of the total equivalents of amines. They are preferably present in amounts ranging from about 1% to about 20% by weight and most preferably 3%–5% by weight. Examples of the triamines include diethyltriamine, poly (oxypropylene) triamine, and the like.

Thus, the interpenetrating polymers of the present invention are prepared from the two interpenetrating networks, one network generated from the reaction of the amine and the isocyanate (to form polyurea), the other network from the free radical polymerization of the acrylates (to form the polyacrylate). In the resulting IPN, the ratio of polyurea to polyacrylate ranges from about 90:10 to about 50:50, although it is most preferred that the ratio ranges from 80:20 to 70:30 and most preferably 75/25.

The polymerization reaction, i.e., reaction between the amino, acrylic ester, isocyanate, and free radical initiator is conducted under conditions to form simultaneous interpenetrating networks. The networks are in the same volume and the networks are formed substantially simultaneously. Techniques for preparing IPN are known to one skilled in the art and are applicable here. The monomeric precursors, i.e., the amines and the isocyanate and the acrylic ester and the initiator are mixed together, and the resultant polymerization reaction is simultaneous or substantially simultaneous, in accordance therewith. For a general procedure, see U.S. Pat. No. 4,536,554 to Lim, et al., U.S. Pat. No. 4,983,702 to Mueller, et al., U.S. Pat. No. 5,087,392 to Burke, et al., the contents of which are all incorporated by reference. The polymerization is generally carried out at temperatures ranging from about room temperature to about 145° C. It is generally preferred to initiate the polymerization at relatively low temperatures, such as from about 45° C. to about 120° C., and then increase the temperature to about 110° C. to 130° C. as the reaction proceeds. Generally, post-curing is done at about 140°–145° C.

Usually, the polymerization is conducted under an inert nitrogen atmosphere in order to exclude the oxygen of the atmosphere which has deteriorating effects on the formation of polymers of the invention.

Contact lenses can be made by shaping the interpenetrating network polymer using conventional and well known procedures and apparatus such as a mold in the shape of a contact lens and thereafter hydrating the dry lens to the final configuration.

In a preferred embodiment, the interpenetrating polymer network of the present invention is prepared using a Reaction Injection Molding (RIM) Machine. The use of the RIM Machine and the subsequent molding of the IPNs of the present invention are described in copending application assigned to the assignee of the present invention, having Ser. No. 08/415,000, entitled, A NOVEL REACTION INJECTION MOLDING PROCESS FOR THE MANUFACTURE OF PRECISION CONTACT LENSES, the contents of which are incorporated herein by reference.

Reaction injection molding requires that the monomer streams mix at high shear rates which produce turbulent flow. The turbulent mixing assures material uniformity and complete reaction.

The RIM process is well described by L. T. Manzione in *The Encyclopedia of Polymer Science and Engineering; 2nd Edition* Vol 14, pg. 72. It is a molding process wherein two or more streams of monomers react in the mold to form a polymer.

In a typical polymerization using a two stream RIM machine, a blend comprising diamines and triamines are placed in a material reservoir and heated to about 80° C. A second blend comprising the diisocyanate, acrylic esters and an organic catalyst are placed in the second material reservoir.

The two blends are mixed by impingement at a pressure between 400–3000 psi and the resulting liquid which forms an IPN upon curing is injected into a mold in the shape of a contact lens. The injection time ranges less than one minute, generally from 0.02–0.3 seconds. The polymer may be post-cured for one hour in an oven at 100° C.

In a typical polymerization using a three stream RIM machine, a blend (Stream 1) of diamines and triamines is placed in the first reservoir. A second blend (Stream 2) of acrylic esters is placed in the second reservoir, while a third blend (Stream 3) of a diisocyanate and free radical initiators is placed in the third material reservoir. The three streams are mixed by impingement at a mixhead in the RIM machine and the resulting liquid which forms an IPN upon curing is injected into a mold in the shape of a contact lens.

The free radical polymerization of the acrylates is typically very fast, as is the reaction between the polyamines and the isocyanates. Optionally an inert diluent is added and moderates the reaction, allowing it to be compatible with the RIM process. The preferred inert diluent in the present invention is water. Additionally, water also acts as a mold release agent (see below) for removing the cured polymer from the mold assembly.

The contact lenses of the present invention are prepared by casting the IPN generated in the RIM apparatus in a suitable mold assembly for contact lens. The mold can be made of glass, metal or plastic, but it is preferred to be made of aluminum or stainless steel. The mold assembly is preferably comprised of two mold halves which are positioned to define a cavity in the shape of a contact lens between the convex surface of one mold half and the concave surface of the other mold half. The cavity may have variable thickness, as required to provide the correct dioptric power. The variable thickness may be calculated using optical formulas familiar to those skilled in the art. The central thickness of the cavity ranges from about 0.00039 inches to about 0.0118 inches. The two mold halves are held together by clamping means, such as a clamp, bolt or hinges and the like. It is preferred that the molds are two-piece aluminum plates. The mold has a central sprue or gate and is equipped with at least one vent. The central sprue or gate is the opening that connects the RIM machine to the mold and through which the streams of components are injected after being mixed at the mixhead. The vent may be located at each of the four mold edges, at the end of the mold furthest from the sprue, but preferably it is located within 4–5 inches of the sprue. In a preferred embodiment, an annular gated mold is utilized. The mold is usually heated at a temperature of 50° C. to 150° C. and preferably from 75°–125° and most preferably at 100° C. When the mold is at that temperature, the liquid capable of forming an IPN upon polymerization or curing is injected into the mold wherein the polymerization is completed, the resultant product is gelled and hardened. The material may additionally be post-cured in the mold. After this step, the mold is opened manually, and the elastomeric film is removed from the mold wherein it is post-cured again in a heated environment such as an oven. The film is converted to a hydrogel by immersion in a buffered saline solution.

The polymeric material obtained by the present invention can be utilized to make contact lenses, by altering the shape and dimensions of the injection mold according to ophthalmic specifications.

The contact lenses, thus prepared, exhibit excellent optical and mechanical properties.

Along with a high tensile and shear strength, the contact lenses additionally show excellent elongation and wettability. In addition, the lenses formed from the IPNs of the present invention have high oxygen permeability and are transparent to visible light. The homogeneous nature of the interpenetrating networks present in the lens is confirmed by the single glass transition temperature exhibited by the contact lens of the present invention. The simultaneous nature of the two polymerization reactions, occurring in the immediate vicinity of each other, is essential in determining the homogeneity of the resulting polymer network. In a comparative example, the polyurea and polyacrylic networks were produced sequentially; i.e., the polyamines were condensed with the diisocyanate to give a pure polyurea material. This was mixed with a mixture of acrylic esters, and polymerized using a free radical initiator. Such a sequentially produced polyurea/polyacrylic material exhibited three separate glass transition temperatures. The pure polyurea material by itself exhibits two glass transition temperatures. The homogeneity observed in the contact lenses of the present invention ensures excellent optical properties in the lens.

The optical clarity of the lens is influenced by the polyurea/polyacrylic ratio present in the lens material. However at the indicated ratios hereinabove, the hydrogels are transparent to visible light.

Also, the water uptake decreases as the polyacrylic content increases. However, the water uptake remains almost constant when the polyurea/polyacrylic ratio is greater than 70/30.

The following examples will serve to illustrate the principles and scope of the present invention.

In the following examples, various abbreviations are utilized. The table below contains the abbreviations to which reference is made in the examples.

| CODE | CHEMICAL NAME | MOL.WT. |
| --- | --- | --- |
| Jeffamine ED-900 | Poly(oxyethylene) diamine | 1179 |
| Jeffamine ED-2600 | Poly(oxyethylene) diamine | 2277 |
| Jeffamine D-2000 | Poly(oxypropylene) diamine | 2000 |
| Jeffamine T-403 | Poly(oxypropylene) triamine | 440 |
| Jeffamine EDR148 | Triethylene glycol triamine | 148 |
| DETA | Diethylene triamine | 103 |
| Desmodur W | 4,4'-Methylene-bis-cyclohexylisocyanate), $H_{12}MDI$ | 262 |
| HEMA | Hydroxyethyl methacrylate | 130 |
| PEGMA | Polyethylene glycol monomethacrylate | 306 |
| TEGDMA | Triethylene glycol dimethacrylate | 286 |
| PEG (600)DMA | Poly(ethylene glycol-600)dimethacrylate | 770 |
| L-256 | Lupersol 256 | |
| BPO | Benzoyl peroxide | 242 |

EXAMPLE I

A blend was made of 589.5 parts ED-900, 400 parts D-2000, 155.4 parts EDR-148 and 34.3 parts DETA. This blend was called Stream 1. A second blend was made of 589.5 parts $H_{12}MDI$, 560.1 parts HEMA, 29.48 parts TEGDMA and 11.9 parts L-256. This blend was called Stream 2. The streams were placed in the material reservoirs of a two steam laboratory scale RIM machine. Stream 1 was heated to about 80° C. to maintain fluidity of the materials. Stream 2 was maintained at room temperature to insure stability of the materials. The streams were mixed by impingement at a pressure of 2500 psi. and injected into a two piece aluminum mold. The mixing ratio was 1.010 parts Stream 1 for each part of Stream 2. The injection time is 0.20 seconds. These conditions produced about 20 gm. of polymer in which both networks were separate and simultaneously produced.

The mold consisted of two aluminum plates. One of the plates was machined such that it had two compartments. One compartment was designed to produce a film 100 microns thick. The other compartment was designed to produce a film 800 microns thick. The mold was held together by bolts. The mold was heated to 100° C. It is attached to the RIM machine. The material was post-cured in the mold for 10 minutes following the injection molding operation.

The mold was opened manually and the elastomeric film was removed from the mold. The demolded film was post cured for one hour in an oven at 100° C. The film was converted to a hydrogel by immersion in a buffered saline solution.

The material produced was a clear IPN hydrogel of 75% (weight) urea component and 25% (weight) methacrylic portion. Following hydration the material had the following properties:

| | |
| --- | --- |
| Water content | 34% |
| Modulus | 262 psi |
| Tensile strength | 300 psi |
| Elongation at break | 238% |

This material was suitable for use as a contact lens.

EXAMPLES II TO V

A series of IPN elastomers were prepared using the methods of Example 1. The formulations and properties are shown in Table II.

| EXAMPLE | II | III | IV | V |
|---|---|---|---|---|
| Stream 1 | | | | |
| ED-900 | 589.5 | 589.5 | 589.5 | 471.6 |
| ED-2000 | — | — | — | — |
| D-2000 | 200 | — | 400 | 400 |
| EDR-148 | 155.4 | 155.4 | 229.4 | — |
| DETA | 34.3 | 34.3 | — | 34.3 |
| Stream 2 | | | | |
| H$_{12}$MDI | 563.3 | 537.1 | 589.5 | 1133.8 |
| HEMA | 483.6 | 412.68 | 566.9 | — |
| PEGMA | — | — | — | 454.0 |
| TEGDMA | 25.4 | 21.7 | 29.8 | 23.9 |
| L-256 | 10.2 | 8.7 | 11.9 | 9.6 |
| UREA/ACRYLIC RATIO | 75/25 | 75/25 | 75/25 | 75/25 |
| STREAM 1/STREAM 2 | 0.90 | 0.76 | 1.02 | 1.37 |
| Water content (%) | 37.5 | 47.1 | 33.1 | 60.8 |
| Modulue (psi) | 218 | 87 | — | 133 |
| Tensile strength (psi) | 263 | 101 | 110 | 81 |
| Elongation at break (%) | 206 | 103 | 169 | 101 |
| Appearance | clear | opaque | hazy | clear |

The materials of Example II and Example V were suitable for contact lens use.

EXAMPLE VI

A blend was made of 471.6 parts ED-900, 228 parts ED-2000, 400 parts D-2000 and 34.3 parts DETA. This blend was called Stream 1. A second blend was made of 314.4 parts H$_{12}$MDI, 454.0 parts HEMA, 23.91 parts TEGDMA and 9.6 parts L-256. This blend was called Stream 2. The streams were placed in the material reservoirs of a two stream laboratory scale RIM machine. Stream 1 was heated to about 80° C. to maintain fluidity of the materials. The streams were mixed by impingement at a pressure of 900 psi. and injected into a two piece aluminum mold. The mixing ratio was 1.37 parts Stream 1 for each part of Stream 2. The injection time was 0.25 seconds. These conditions produced about 25 gm. of polymer in which both networks are separate and simultaneously produced.

The mold used for this example was described in Example I.

The mold was opened manually within one minute of injection and the elastomeric film is removed from the mold. The demolded film was post-cured for about 40 minutes in an oven at 100° C. The film was converted to a hydrogel by immersion in a buffered saline solution. The material produced was a clear IPN hydrogel of 75% (weight) urea component and 25% (weight) methacrylic portion. Following hydration the material has the following properties:

| | |
|---|---|
| Water content | 50% |
| Modulus | 93 psi |
| Tensile strength | 91 psi |
| Elongation at break | 239% |

This material is suitable for use as a contact lens.

EXAMPLES VII TO IX

A series of IPN elastomers were prepared using the methods of Example VI. The formulations and properties are shown in Table III.

TABLE III

| EXAMPLE | VII | VIII | IX |
|---|---|---|---|
| Stream 1 | | | |
| ED-900 | 353.7 | 471.6 | 471.6 |
| ED-2000 | 227.9 | 455.8 | 455.8 |
| D-2000 | 400 | 200 | 200 |
| DETA | 34.3 | 34.3 | 34.3 |
| Stream 2 | | | |
| H$_{12}$MDI | 288.2 | 314.4 | 314.5 |
| HEMA | 408 | 463 | 463 |
| TEGDMA | 21.5 | 24.3 | 24.3 |
| L-256 | 8.6 | 19.4 | 9.8 |
| UREA/ACRYLIC RATIO | 75/25 | 75/25 | 75/25 |
| STREAM 1/STREAM 2 | 1.35 | 1.37 | 1.39 |
| Water content | 40.1 | 43.1 | 42.2 |
| Modulus | — | 254 | 245 |
| Tensile Strength | 141 | 292 | 221 |
| Elongation at break | 260 | 165 | 221 |
| Appearance | clear | clear | clear |

The materials of Examples VII, VIII and IX were suitable for contact lens use.

EXAMPLE X

A Hi-Tech three stream RIM machine was used for this example. The machine was fitted with an Edge-Sweets four component mixhead. The mixing was by impingement.

The chemical system consisted of eight separate chemicals. The materials were blended as follows:

Stream 1

| 870.9 gm Jeffamine ED-900 | Poly(oxyethylene) diamine MW 1179 |
|---|---|
| 420.9 gm Jeffamine ED-2000 | Poly(oxyethylene) diamine MW 2277 |
| 738.7 gm Jeffamine D-2000 | Poly(oxypropylene) diamine MW 2000 |
| 63.5 gm DETA | Diethylene Triamine |

(Jeffamine is a trademark of the Texaco Chemical Company)

Stream 2

| 3502 gm HEMA | Hydroxyethyl Methacrylate |
|---|---|
| 72.4 gm TMPTMA | Trimethylolpropanetrimethacrylate |

Stream 3

3140 gm H$_{12}$MDI 4,4'-methylene bis (cyclohexyl isocyanate)
96.6 gm Benzoyl peroxide
The process conditions were:

| Stream | Pressure | Orifice | Flow Rate | Viscosity |
|---|---|---|---|---|
| 1 | 2700 psi | 0.75 mm | 99.3 gm/sec | 52 cps |
| 2 | 1900 psi | 1.25 mm | 42.30 gm/sec | 6 cps |
| 3 | 1900 psi | 0.50 mm | 28.4 gm/sec | 24 cps |

Stream 1 was split and injected into two separate ports. The ports were chosen to be 90° apart. This gave direct impingement of one-half the amine and the isocyanate streams.

The injection time was set at 0.03 sec. and a shot weight of 13.6 gm obtained.

The injection head of the RIM machine was affixed to a hardened steel mold. The mold had a channel 2 mm wide and 4 mm deep leading to a contact lens shaped cavity. The injection of the formulation into the mold produced a contact lens.

EXAMPLES XI, XII, XIII

Examples XI, XII, XIII were duplicates of Example X except that the flow rate of Stream 2 was changed to change the ratio of urea to acrylic fractions of the IPN's. The flow rates of Stream 1 and Stream 3 were adjusted to obtain a constant shot size. The orifice size was controlled to maintain at the pressures of Example X.

| Example  |                     | XI    | XII   | XIII  |
|----------|---------------------|-------|-------|-------|
| Stream 1 | Flow rate (gm/sec)  | 104.0 | 78.3  | 92.8  |
| Stream 2 | Flow rate (gm/sec)  | 33.2  | 66.7  | 50.8  |
| Stream 3 | Flow rate (gm/sec)  | 29.7  | 22.4  | 26.5  |
| UREA/ACRYLIC RATIO |           | 80/20 | 60/40 | 70/30 |

When these formulations were injected into a heated mold with a contact lens shaped cavity with an annular gate, a contact lens was formed.

EXAMPLES XIV, XV, XVI

Examples XIV, XV, XVI were duplicates of Example XI, XII and XIII except that the flat plate mold of Example 1 was used.

| Example  |                     | XIV   | XV    | XVI   |
|----------|---------------------|-------|-------|-------|
| Stream 1 | Flow rate (gm/sec)  | 120.2 | 78.3  | 92.8  |
| Stream 2 | Flow rate (gm/sec)  | 38.4  | 66.7  | 50.8  |
| Stream 3 | Flow rate (gm/sec)  | 34.4  | 22.4  | 26.5  |
| UREA/ACRYLIC RATIO |           | 80/20 | 60/40 | 70/30 |

These materials were used for thermal property testing.

COMPARATIVE EXAMPLE I

Polyurea films were prepared using the method of Example X except that Stream 2 was blocked to prepare a clear polyurea film.

COMPARATIVE EXAMPLE II

A solution of 47.5 g HEMA, 2.5 g polyethylene glycol (600) dimethacrylate and 1 g benzoyl peroxide was prepared. This is the acrylic portion of Example X.

A sequential IPN was prepared from 6.06 g piece of film from Example X and 2.54 g of the above described HEMA solution. The HEMA solution was mixed with 30 ml of methyl alcohol. This step was performed to assure a uniform distribution of the HEMA mixture through the film. The urea film was immersed in the methanol HEMA mixture. The jar containing the components was placed on a roller mill (US Stoneware) and mixed 24 hours. The methanol was removed using a vacuum of 20 mmHg. The methanol free sample was placed in an 80° C. oven for 4 hours. The recovered film has a mass of 6.61 g. This indicates that the HEMA evaporated more quickly than it polymerized under these conditions.

COMPARATIVE EXAMPLE III AND IV

The procedure of Comparative Example II was repeated using different urea/HEMA ratios. 30 ml of methanol was used in all cases.

| Comparative Example | urea (g) | HEMA (g) | post polymerization weight (g) |
|---------------------|----------|----------|--------------------------------|
| III                 | 7.24     | 2.41     | 7.92                           |
| IV                  | 5.36     | 1.34     | 5.31                           |

In both of these examples the final weight indicated that the HEMA was lost before polymerization could occur.

COMPARATIVE EXAMPLE V

A 1.45 g piece of polyurea film was immersed in 0.48 g of HEMA and 5 ml of methanol. The methanol was removed with a vacuum of 20 mmHg. The HEMA containing polyurea film was tightly wrapped in aluminum foil. The foil packet was placed in an 80° C. oven for 4 hours. The resulting film had a mass of 1.92 g and a dry feel. The sequential IPN was evaluated by thermal analysis.

COMPARATIVE EXAMPLE VI

The HEMA mix of Comparative Example I was polymerized by placing 1 g in an aluminum weighing dish. The material was placed into an oven at 80° C. for four hours. A clear glassy solid was formed.

Determination of the Glass Transition Temperature

The glass transition is a second order transition where the motions of a polymer chain are abruptly increased or decreased. The temperature at which the transition occurs is the glass transition temperature. The change in chain motion results in a change of polymer properties. One property that changes is known as Tan δ.

The glass transition temperatures of the materials of Examples XIII, XIV and XV were determined using a Perkin Elmer dynamic mechanical analyzer (DMA 7). Samples were rectangular samples in an extension geometry. The samples were heated at a rate of 2° C. per minute. The samples were heated from −50° C. to 150° C.

|                |             | Glass Transitions |         |         |
|----------------|-------------|---------|---------|---------|
| EXAMPLE        | urea/acrylic | 1       | 2       | 3       |
| XIII           | 75/25       | 2.3° C. |         |         |
| XIV            | 80/20       | −28.3° C. | 2.4° C. |         |
| XVI            | 70/30       | 7.0° C. |         |         |
| Comparative I  | 100/1       | −41.7° C. | −8.0° C. |         |
| Comparative VI | 75/25       | −29.2° C. | 5.0° C. | 48.6° C. |

These data show that the base urethane material has two glass transitions. The simultaneous IPN materials disclosed herein have a single glass transition. This is characteristic of a homogeneous material. The sequential material exhibits three glass transitions. This is characteristic of a non-homogeneous material. Clearly, the simultaneous process produces a different material than the sequential material.

The above preferred embodiments and examples are given to illustrate the scope and spirit of the present invention. These embodiments and examples will make apparent to those skilled in the art other embodiments and examples. These other embodiments and examples are within the contemplation of the present invention. Therefore, the present invention should be limited only by the appended claims.

What is claimed is:

1. A homogenous interpenetrating polymer network exhibiting a single glass transition temperature formed by polymerization of a reactive mixture of polymerizable components, said reactive mixture comprising
(a) an amine mixture consisting of polyamines A and B, said amine mixture being present in about 20–60% by weight in said reactive mixture wherein A is $$R_{13}HN-\underset{R_{14}}{\underset{|}{C}}-Z_1-\left(O-\underset{R_{19}}{\underset{|}{C}}\right)_f O-Z_2-\underset{R_{11}}{\underset{|}{C}}-NHR_{12}$$

and B is
$H_2N-R-(O-R)_{f_1}-NH_2$
  $f_1$ is an integer from 1–75;
  R is an alkylene containing 3 carbon atoms;
  f is an integer between 1 and 150 inclusive;
  $R_{10}$, $R_{11}$, $R_{12}$, $R_{13}$ and $R_{14}$ are independently hydrogen or lower alkyl;
  $Z_1$ and $Z_2$ are independently a chemical bond or lower alkylene with A and B present in relative weight percentages ranging from about 60 to about 100% A; and wherein A is different from B;
(b) an organic di- or poly-isocyanate present in sufficient quantity in said reactive mixture to react with the amine mixture of (a), forming therefrom a polyurea network;
(c) an acrylic ester of the formula:

$$\underset{R_3}{\overset{CH_2}{\underset{\|}{C}}}-\underset{\underset{O}{\|}}{C}-O-Z_3-\left[Z_4-O-Z_5\right]_m Z_6-O-R_4$$

or $$R_6-\left(R_7-O-\underset{\underset{O}{\|}}{C}-\underset{R_5}{\overset{CH_2}{\underset{\|}{C}}}\right)_p$$

wherein
  $R_3$ is hydrogen or lower alkyl;
  m is an integer from 0 to 150;
  $Z_3$ and $Z_5$ are independently lower alkylene;
  $Z_4$ and $Z_6$ are independently a chemical bond or lower alkylene;
  $R_4$ is hydrogen, lower alkyl or $$\underset{\underset{O}{\|}}{C}\overset{CH_2}{\underset{\|}{-}}R_5;$$

$R_5$ is hydrogen or lower alkyl;
  $R_6$ and $R_8$ are independently lower alkyl;
  p is an integer of 1 to 3; and
  $R_7$ is lower alkylene or chemical bond or $-CH_2(OCH_2CH_2)_q$;
  q is an integer from 0 to 200 inclusive; said acrylic ester being present in about 10–50% by weight in the reactive mixtures;
(d) a free radical initiator being present in sufficient quantity in the reactive mixture to polymerize the acrylic ester of (c), forming a polyacrylic network; and
(e) a triamine being present in sufficient amount to crosslink interpenetrating polymer network;
wherein the ratio by weight of polyurea to polyacrylic ranges from about 50:50 to about 90:10, and wherein the weights of the components in the reactive mixtures sum up to 100%.

2. The interpenetrating polymer network according to claim 1 wherein B is a polyoxypropylene diamine of the formula:

$$H_2N-CH-CH_2-\underset{CH_3}{\underset{|}{}}\left(O-\underset{CH_3}{\underset{|}{CH}}-CH_2\right)_{f_1}NH_2$$

or $$H_2N(CH_2)_2CH_2-\left(O-\underset{CH_3}{\underset{|}{CH}}-CH_2\right)_{f_1}NH_2$$

3. The interpenetrating polymer network according to claim 1 wherein the triamine is present in the reactive mixture in an amount ranging from 30 to 50% total amine equivalents.

4. The interpenetrating polymer network according to claim 1 wherein the triamine is diethylene triamine or polyoxypropylene triamine.

5. The interpenetrating polymer network according to claim 1 wherein the isocyanate is methylene-bis (4,4'-cyclohexylisocyanate) or isophorone diisocyanate.

6. The interpenetrating polymer network according to claim 1 wherein the free radical initiator is 2,5-dimethyl-2,5-di-(2-ethylhexanoylperoxy) hexane, benzoyl peroxide, t-butyl hydroperoxide, t-butyl peroxide or lauryl peroxide.

7. The interpenetrating polymer network according to claim 1 wherein said ratio by weight of polyurea to polyacrylic ranges from about 80:20 to about 70:30.

8. The interpenetrating polymer network according to claim 1 wherein said ratio by weight of polyurea to polyacrylic is about 75:25.

9. The interpenetrating polymer network according to claim 1 wherein the isocyanate is present in the reactive mixture in an amount ranging from about 15% to about 50% by weight.

10. The interpenetrating polymer network according to claim 9 wherein the isocyanate is present in an amount ranging from about 25% to about 40% by weight.

11. The interpenetrating polymer network according to claim 1 wherein the free radical initiator is present in the reactive mixture in an amount ranging from about 0.01% to about 1% by weight.

12. The interpenetrating polymer network of claim 1 in which A is $$H_2N-\left[\phantom{x}O-\phantom{x}\right]_f NH_2$$

and f is an integer from 2–150.

13. The interpenetrating polymer network according to claim 1 formed by polymerization of a reactive mixture comprising
(a) an amine mixture consisting of polyamines A and B, said polyamines being present in about 20–60% by weight, wherein A is $$R_{13}HN-\underset{R_{14}}{\underset{|}{C}}-Z_1-\left(O-\underset{R_{10}}{\underset{|}{C}}\right)_f O-Z_2-\underset{R_{11}}{\underset{|}{C}}-NHR_{12}$$

and B is
$H_2N-R-(O-R)_{f_1}-NH_2$ $f_1$ is an integer from 1–75;

R is an alkylene containing 3 carbon atoms;

f is an integer between 1 and 150, inclusive, $R_{10}$, $R_{11}$, $R_{12}$, $R_{13}$ and $R_{14}$ are independently hydrogen or lower alkyl;

$Z_1$ and $Z_2$ are independently a chemical bond or lower alkylene with A and B present in relative weight percentages ranging from about 60 to about 100% A; and wherein A is different from B;

(b) an organic di- or poly-isocyanate present in sufficient quantity in said reactive mixture to react with the amine mixture of (a), forming therefrom a polyurea network;

(c) 10–50% by weight in the reactive mixture of an acrylic ester component consisting of a mixture of a first acrylate of the formula

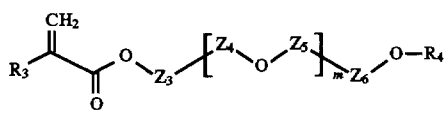

and a second acrylate being a diacrylate of the formula

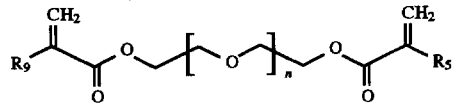

or a triacrylate of the formula

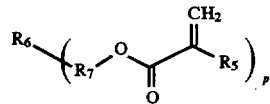

or a mixture thereof, wherein $R_3$, $R_4$, $R_5$, $R_9$ and $R_8$ are independently hydrogen or lower alkyl;

$R_6$ is lower alkyl;

$R_7$ is a chemical bond or lower alkylene;

m and n are independently integers from 0 to 30 and p is 3;

said weight ratio of the first acrylate to second acrylate ranges from about 80:20 to about 95:5, (d) a free radical initiator being present in sufficient quantity in said reactive mixture to polymerize the acrylic ester of (c), forming therefrom a polyacrylic network, and (e) a triamine present in sufficient amount to crosslink the amine mixture of (a), wherein the ratio by weight of polyurea to polyacrylic ranges from about 90:10 to about 50:50.

14. The interpenetrating polymer network according to claim 13 wherein B is a polyoxypropylene diamine of the formula:

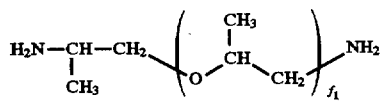

15. The interpenetrating polymer network according to claim 13 wherein the triamine is present in the reactive mixture in an amount ranging from about 30 to 50% of the total amine equivalents.

16. The interpenetrating polymer network according to claim 15 wherein the triamine is diethylene triamine or polyoxypropylene triamine.

17. The interpenetrating polymer network according to claim 13 wherein the isocyanate is methylene-bis (4,4'-cyclohexylisocyanate) or isophorone diisocyanate.

18. The interpenetrating polymer network according to claim 13 wherein the free radical initiator is 2,5-dimethyl-2,5-di-(2-ethylhexanoylperoxy) hexane, benzoyl peroxide, t-butyl hydroperoxide, t-butyl peroxide or lauryl peroxide.

19. The interpenetrating polymer network according to claim 13 wherein said ratio by weight of polyurea to polyacrylic ranges from about 70:30 to about 80:20.

20. The interpenetrating polymer network according to claim 13 wherein said ratio by weight of polyurea to polyacrylic is about 75:25.

21. The interpenetrating polymer network according to claim 13 wherein the isocyanate is present in the reactive mixture in an amount ranging from about 15% to about 50% by weight.

22. The interpenetrating polymer network according to claim 21 wherein the isocyanate is present in an amount ranging from about 25% to about 40% by weight.

23. The interpenetrating polymer network according to claim 13 wherein the free radical initiator is present in the reactive mixture in an amount ranging from about 0.01% to about 1% by weight.

24. The interpenetrating polymer network according to claim 13 wherein $R_3$, $R_4$, $R_5$ and $R_9$ are $CH_3$.

25. The interpenetrating polymer network according to claim 13 wherein $R_3$, $R_5$, and $R_9$ are $CH_3$, m is 0, $R_4$ is hydrogen and n is 2.

26. The interpenetrating polymer network according to claim 13 wherein $R_3$, $R_5$ and $R_9$ are $CH_3$, m is 4, $R_4$ is hydrogen and n is 2.

27. The interpenetrating polymer network of claim 13 wherein m is 4, $R_4$ is hydrogen, p is 3, $R_6$ is ethyl, $R_7$ is ethylene, and $R_3$ and $R_8$ are $CH_3$.

28. The interpenetrating polymer network of claim 13 wherein A is

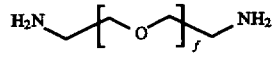

and f is an integer from 30–70.

29. An article of manufacture comprised of the interpenetrating polymer network of any one of claims 1–28.

30. The article of manufacture according to claim 29 which is a contact lens.

* * * * *

UNITED STATES PATENT AND TRADEMARK OFFICE
CERTIFICATE OF CORRECTION

PATENT NO. : 5,674,942
DATED : Oct. 7, 1997
INVENTOR(S) : Gregory A Hill et al

It is certified that error appears in the above-indentified patent and that said Letters Patent is hereby corrected as shown below:

Column 19, lines 5-10, replace structure with following:

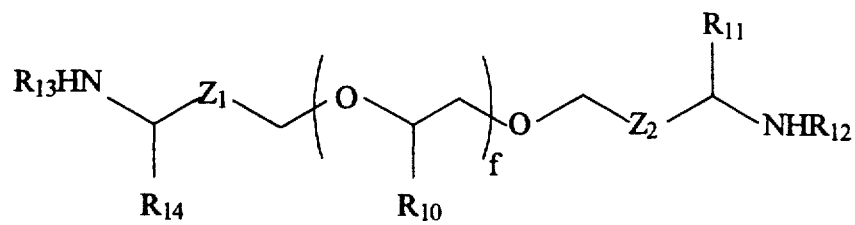

Column 19, lines 33 through 37, and Column 21, lines 30 through 35, replace structure with following:

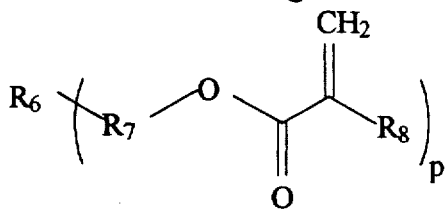

Signed and Sealed this

Tenth Day of February, 1998

*Attest:*

BRUCE LEHMAN

*Attesting Officer*   Commissioner of Patents and Trademarks